(12) United States Patent
Atasu et al.

(10) Patent No.: US 8,386,411 B2
(45) Date of Patent: Feb. 26, 2013

(54) METHOD AND DEVICE FOR DISTRIBUTING PATTERNS TO SCANNING ENGINES FOR SCANNING PATTERNS IN A PACKET STREAM

(75) Inventors: Kubilay Atasu, Zurich (CH); Christoph Hagleitner, Zurich (CH); Jonathan Bruno Rohrer, Zurich (CH); Jan Van Lunteren, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/793,725

(22) Filed: Jun. 4, 2010

(65) Prior Publication Data

US 2010/0312742 A1 Dec. 9, 2010

(30) Foreign Application Priority Data

Jun. 5, 2009 (EP) .................................... 09162120

(51) Int. Cl.
*G06F 17/00* (2006.01)
*G06N 5/02* (2006.01)
(52) U.S. Cl. ......................................................... 706/48

(58) Field of Classification Search ........................ None
See application file for complete search history.

(56) References Cited

PUBLICATIONS

Yu et al. "Fast and Memory-Efficient Regular Expression Matching for Deep Packet Inspection", ANCS, 2006, pp. 10.*
Ray et al. "Determination of Number of Clusters in K-means Clustering and Application in Colour Image Segmentation", ICAPRDT, 1999, pp. 137-143.*

* cited by examiner

*Primary Examiner* — Jeffrey A Gaffin
*Assistant Examiner* — Li-Wu Chang
(74) *Attorney, Agent, or Firm* — Vazken Alexanian

(57) ABSTRACT

A method and a device for distributing patterns to scanning engines for scanning packets in a packet stream are provided. The method includes providing a plurality of scanning engines and patterns, calculating a respective distance metric for every pair of patterns, and providing a plurality of distribution functions. Further, the method includes calculating a respective sum of the calculated distance metrics for distributing the patterns for each of the distribution functions, and utilizing the sums for selecting a distribution function of the D distribution functions for distributing the patterns to the M scanning engines. A device for implementing the method is also provided.

15 Claims, 5 Drawing Sheets

METHOD AND DEVICE FOR DISTRIBUTING PATTERNS TO SCANNING ENGINES FOR SCANNING PATTERNS IN A PACKET STREAM

CROSS REFERENCE TO RELATED APPLICATION

This application claims priority under 35 U.S.C. §119 from European Patent Application No. 09162120.1 filed Jun. 5, 2009, the entire contents of which are incorporated herein by reference.

BACKGROUND OF THE INVENTION

1. Field of the Invention

The present invention relates to the field of packet scanning and more particularly, to a method and a device for distributing patterns to scanning engines for scanning packets in a packet stream.

2. Description of the Related Art

Packet scanning, also known as packet content scanning, is an important part of network security and application monitoring. Packets in a stream are mapped against a set of patterns to detect security threats or to gain information about the stream or packet stream. Due to their flexibility, regular expressions are a common way to define such patterns. Finite automata are typically used to implement regular expression scanning or parsing.

In contrast to NFA (Non-Deterministic Finite Automata), DFA (Deterministic Finite Automata) only require one state transition per input value. This yields higher scanning or parsing rates and a smaller parse state which has to be maintained per flow. Therefore, DFA are preferred for Network Intrusion Detection Systems (NIDS) although they usually require more memory than NFA.

Regarding NIDSs, the frequency of network attacks increases every year, and the methods of attack are becoming more sophisticated, and NIDS keep up with these trends. An example of an NIDS is known from "SNORT network institution detection systems", http://www.snort.org, referenced as [1]. Such NIDS apply very powerful and flexible content-filtering rules defined using regular expressions. This has triggered a substantial amount of research and product development in the area of hardware-based accelerators for pattern matching, as this seems to be the only viable approach for scanning network data against the increasingly complex regular expressions at wire-speed processing rates of tens of gigabits per second.

Moreover, in typical network environments, the number of open sessions at any given time can be on the order of millions, and the streams are scanned in an interleaved fashion. Therefore, the internal state of the scanning engine needs to be stored and reloaded whenever the input stream is switched.

To reach higher throughput for the complex sets of expressions, a compact representation of the data structures describing the automata is required, so that it can be kept in fast on-chip memories.

If the data structures become too large, so that an off-chip memory needs to be used, the higher latency of such memories limits the rate at which the input stream can be processed. In this regard, S. Kumar, B. Chandrasekaran, J. Turner, and G. Varghese, "Curing regular expressions matching algorithms from insomnia, amnesia, and acalculia", in ANCS '07, pp. 155-164, ACM, 2007, referenced as [2], show that the size of the data structures can grow exponentially if certain regular expressions are combined into one scanning engine.

Accordingly, an embodiment of the present invention provides a memory-efficient distribution of patterns to scanning engines.

SUMMARY OF THE INVENTION

According to an embodiment of the invention, method for distributing patterns to scanning engines for scanning packets in a packet stream is provided. The method includes:

providing a plurality of scanning engines;

providing a plurality of patterns, each pattern having a respective definite memory consumption when compiled onto a scanning engine;

calculating a respective distance metric for every pair of patterns, wherein the respective distance metric represents the difference in memory consumption of the two patterns of the pair when compiled between mutual compilation onto a single scanning engine and separate compilation onto two scanning engines;

providing a plurality of distribution functions, the respective distribution function mapping the patterns to the scanning engines;

calculating, for each of the distribution functions, a respective sum of the calculated distance metrics for distributing the patterns, the respective sum estimating the memory consumption for compiling the patterns to the scanning engines by accumulating the distance metrics of every pair of patterns being mapped to the same scanning engine for the respective distribution function; and utilizing the sums for selecting a distribution function of the distribution functions for distributing the patterns to the scanning engines.

According to another embodiment of the invention, a device for distributing patterns to scanning engines for scanning packets in a packet stream is provided. The device includes:

a plurality of scanning engines;

means for providing a plurality of patterns, where each pattern has a respective definite memory consumption when compiled onto a scanning engine;

means for calculating a respective distance metric for every pair of patterns, wherein the respective distance metric represents the difference in memory consumption of the two patterns of the pair when compiled between mutual compilation onto a single scanning engine and separate compilation onto two scanning engines;

means for providing a plurality of distribution functions, wherein the respective distribution function maps the patterns to the scanning engines;

means for calculating a respective sum of the calculated distance metrics for distributing the patterns for each of the distribution functions, wherein the respective sum estimates the memory consumption for compiling the patterns to the scanning engines by accumulating the distance metrics of every pair of patterns being mapped to the same scanning engine for the respective distribution function; and means for utilizing the sums for selecting a distribution function of the distribution functions for distributing the patterns to the scanning engines, in particular for selecting the distribution function of the distribution functions having the minimal calculated sum for distributing the patterns to the scanning engines.

BRIEF DESCRIPTION OF THE FIGURES

Like or functionally-like elements in the figures have been allotted the same reference signs if not otherwise indicated.

DETAILED DESCRIPTION OF PREFERRED EMBODIMENTS

Exemplary embodiments of the present invention will now be described with reference to the enclosed figures.

Figure 1:
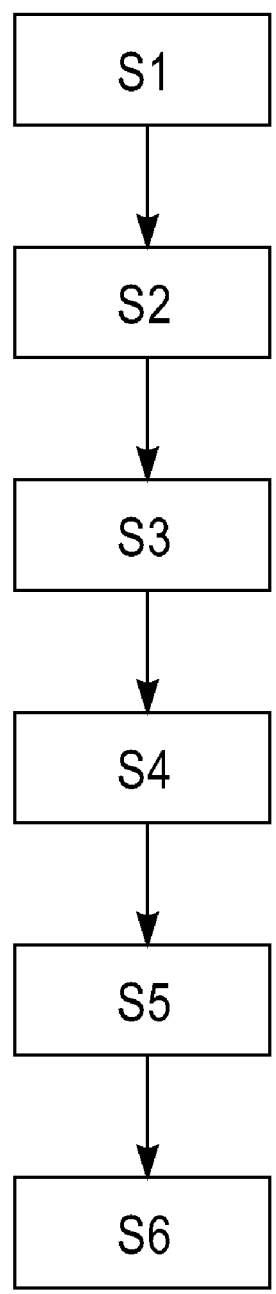
FIG. 1 shows a first embodiment of a sequence of method steps for distributing patterns to scanning engines for scanning packets in a packet stream.

FIG. 1 shows a sequence of essential method steps for distributing patterns to scanning engines for scanning packets in a packet stream. In the sense of the present invention, the term "scanning engine" includes "pattern-scanning engine" or "parsing engine". In particular, a scanning engine is embodied by a DFA.

An embodiment of the method according to the invention as shown in FIG. 1 has the following method steps S1-S6:

Method Step S1:

A plurality of scanning engines is provided. As already indicated above, a scanning engine may be embodied by a DFA.

Method Step S2:

A plurality of patterns is provided, each pattern having a respective definite memory consumption when compiled onto a DFA.

Method Step S3:

A respective distance metric is calculated for every pair of patterns, the respective distance metric representing the difference in memory consumption of the two patterns of the pair when compiled between mutual compilation onto a single DFA and separate compilation onto two DFAs. Thus, the respective distance metric represents the change in required memory or in required storage consumption if patterns i and j are compiled onto a single DFA compared to two individual or separate DFAs for each pattern.

Method Step S4:

A plurality D of distribution functions is provided. The respective distribution function is adapted to map the N patterns to the M scanning engines.

Method Step S5:

For each of the D distribution functions, a respective sum of the calculated distance metrics is calculated, the respective sum estimating the memory consumption for compiling the N patterns to the M scanning engines by pair-wise accumulating the distance metrics of every pair of patterns being mapped to the same scanning engine according to the respective distribution function. Thus, the respective sum includes only the distance metrics of these pair of patterns that share a common scanning engine according to the mapping of the respective distribution function.

Method Step S6:

The distribution function is selected from the D distribution functions. Preferably the distribution function that has the minimal calculated sum for distributing the N patterns to the M scanning engines is selected.

The above mentioned method as elucidated with reference to FIG. 1 may be described as an optimization metric of the pattern distribution problem, i.e. distributing the N patterns to the M scanning engines, e.g. DFAs.

Thus, the pattern distribution problem may be represented as an energy minimization problem based on the optimization metric. Therefore, a weighted graph presentation is derived and it is shown that the energy minimization problem is equivalent to the Maximum Cut Problem as known from R. M. Garey and D. S. Johnson, Computers and Intractability; A Guide to the Theory of NP-Completeness. New York: W.H. Freeman and Co., 1979, referenced as [3].

As a result, the computationally expensive distribution problem is mapped to the energy minimization problem, which enables the application of standard optimization strategies to find an optimal or close-to-optimal solution.

In this regard, the goal is to distribute a set S of N patterns into M DFAs, wherein each DFA receives one subset $$S_k, k \in \{1 \ldots M\}$$

of the N patterns, and the total memory requirement for the M DFAs is minimized. The subsets $S_k$ must be non-overlapping and cover all N patterns in S.

In the following, the energy function $E_{dist}$ is defined. Further, there is an attempt to find the mapping of N patterns to the M DFAs that minimizes this energy function $E_{dist}$. The energy function $E_{dist}$ should be correlated to the memory consumption, that is, it should have high values for bad distributions, and low values for good distributions, and be much less expensive to compute than the actual memory consumption. Therefore, a coefficient $$a_i, i \in \{1 \ldots N\}$$

is defined as a measure of the memory requirement if pattern i is compiled onto a DFA by itself. Further, the coefficient $$b_{i,j}, i,j \in \{1 \ldots N\}$$

is defined as a measure of the memory requirement of the pair of patterns i and j when compiled together into or onto the same DFA. There are N $a_i$ values to be computed. In addition, considering that $$b_{i,j} = b_{j,i} \text{ and } b_{i,i} = a_i, \text{ there exist } \frac{(N-1)^2}{2} b_{i,j}.$$

Based on these coefficients, a mutual distance $m_{i,j}$ of two patterns i and j is defined as $$m_{i,j} = b_{i,j} - a_i - a_j$$

which may be interpreted as the increase in memory consumption when compiling the patterns i and j into the same DFA. Such a mutual compilation may also cause a reduction in memory consumption, such as if the two patterns share a common prefix or a common suffix, which yields a negative $m_{i,j}$ value. When adding a third pattern l to the combined DFA of i and j, an increase in memory consumption is approximated as $$m_{i,j} + m_{j,l}$$

Herewith, the following energy function $E_{dist}$ may be defined to find the distribution that minimizes the overall memory consumption:

$$\min E_{dist} = \sum_{k=1}^{M} \sum_{\substack{i=2 \\ i \in S_k}}^{N} \sum_{\substack{j=1 \\ j \in S_k}}^{i-1} m_{i,j} \qquad (1)$$

Figure 2:
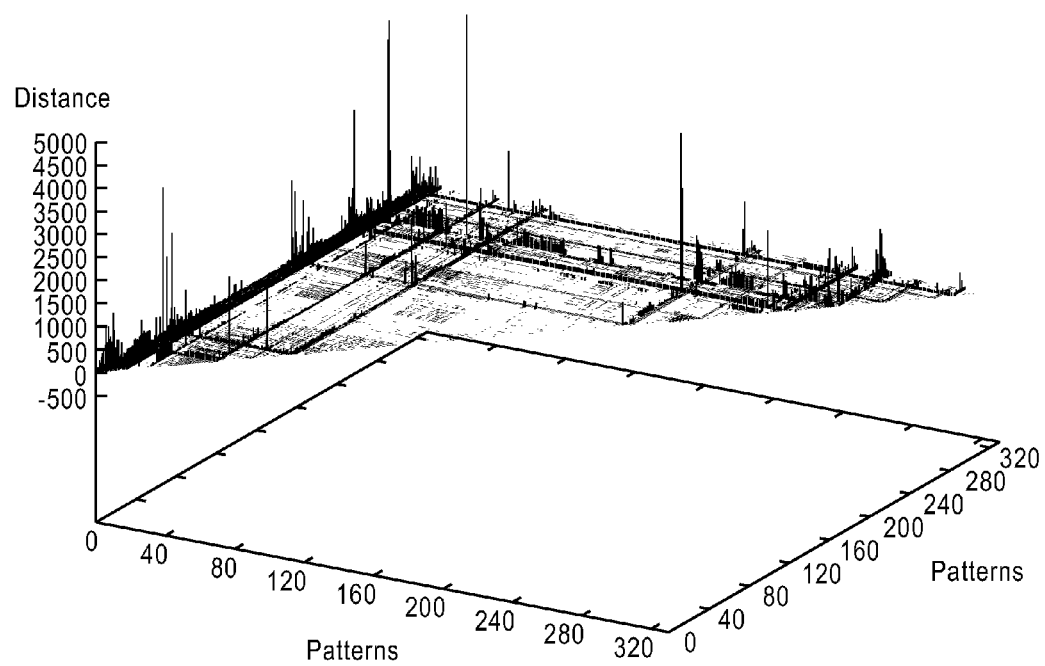
FIG. 2 shows a plot of the pair-wise distance for a set of regular expressions.

For a set of 329 regular expressions, FIG. 2 shows a plot of the pair-wise distance for the set. The plot of FIG. 2 shows that there are certain patterns which are particularly incompatible when compiled together on a DFA resulting in spikes in the plot of FIG. 2. The above mentioned distance metric allows the amount of interaction between a pair of patterns to be quantified.

Figure 3:
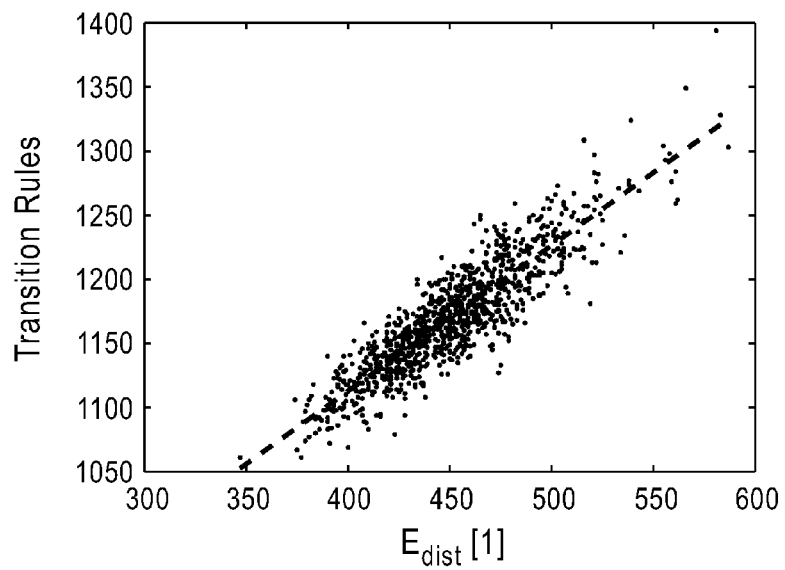
FIG. 3 shows a metric of set of 75 regular expressions randomly distributed on four DFAs.

In this regard, FIG. 3 shows a metric of a set of 75 regular expressions randomly distributed on four DFAs. Thus, FIG. 3 emphasizes the relationship between the defined energy function and the actual number of transition rules after a powerset compilation for a large set of random distributions using the set of 75 regular expressions. A linear least-squares approximation of all data points indicated by a dashed line in FIG. 3 shows that an increase in the energy function often results in a linear increase of the number of transition rules.

Further, as already mentioned above, the energy minimization problem of the above equation (1) is a Maximum Cut problem. This may be proven by the following: A complete graph G(V, E) may be provided, wherein the nodes V represent patterns and the edges E are undirected and weighted based on the mutual distance between the patterns as described above, i.e. the weight of the edge between pattern i and pattern j is $m_{i,j}$.

Figure 4:
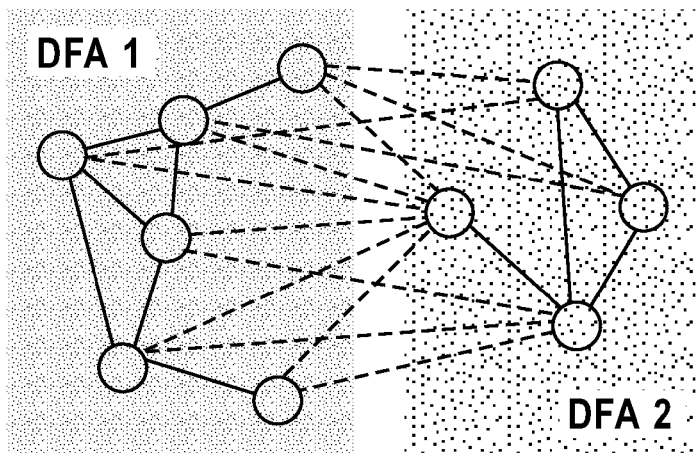
FIG. 4 shows an exemplary illustration of the pattern distribution problem for two DFAs as a Maximum Cut problem.

In this regard, FIG. 4 shows an exemplary illustration of a pattern distribution problem for two DFAs as a Maximum Cut problem. The above defined energy function $E_{dist}$ tries to find the distribution that minimizes the sum of the weights of these edges internal to each DFA, e.g. the solid edges in FIG. 4. On the other hand, the Maximum Cut problem as known from [3] tries to find a distribution that maximizes the sum of the weights by the edges that are cut across the DFAs, e.g. the dashed edges in FIG. 4. The optimization metric for the Maximum Cut problem can be defined as follows:

$$\max E_{cut} = \sum_{k=1}^{M} \sum_{\substack{i=2 \\ i \in S_k}}^{N} \sum_{\substack{j=1 \\ j \notin S_k}}^{i-1} m_{i,j} \qquad (2)$$

Further, the following $E_{tot}$ is defined as a sum of the weights of all edges:

$$E_{tot} = \sum_{i=2}^{N} \sum_{j=1}^{i-1} m_{i,j} \qquad (3)$$

Note that for a given graph G(V, E), $E_{tot}$ is constant and that $$E_{dist} + E_{cut} = E_{tot}.$$

Therefore, the distribution that minimizes $E_{dist}$ maximizes $E_{cut}$. The optimal solution for above equation (1) provides the optimal solution for equation (2) and vice versa.

Recapitulating, the problem of equation (1) is equivalent to the Maximum Cut problem as shown in equation (2). The Maximum Cut problem may be reduced to an energy minimization problem of equation (1) and vice versa. As a result, the problem of equation (1) is NP-hard, and a polynomial-time solution is not likely to exist.

While targeting a pipelined rather than a parallel architecture, Z. K. Baker and V. K. Prasanna, "A methodology for synthesis of efficient intrusion detection systems of FPGAs", in Proc. FCCM '04, pp. 135-144, IEEE, 2004", referenced as [4], represents the pattern distribution problem as a minimum cut problem.

The differences between the problem as defined according to embodiments of the present invention and the one described in [4] are three-fold. First, according to embodiments of the present invention, a Maximum Cut problem is solved, whereas reference [4] solves a Minimum Cut problem. Second, according to embodiments of the present invention, searching for balanced partitions is not performed, whereas [4] uses the Kernighan-Lin algorithm, which finds balanced partitions.

Third, the graph according to embodiments of the invention may have negative edge weights, whereas [4] assumes positive edge weights. Here, it is noted that the general Minimum Cut problem on graphs with positive edge weights is polynomially solvable, whereas the Maximum Cut problem is NP-hard on graphs with positive edge weights and on graphs with both positive and negative edge weights, see reference [5].

In the following, three optimization techniques are shown that can be applied to find an optimal or close-to-optimal solution for the above minimization problem. The first optimization technique is based on integer linear programming (ILP). Here, a binary decision variable $$x_{ik} \in \{0,1\} \text{ for } i \in \{1 \ldots N\}, k \in \{1 \ldots M\}$$

is introduced, which represents whether pattern i is assigned to subset $$S_k (x_{ik}=1) \text{ or not } (x_{ik}=0).$$

Therefore, the objective function is formally defined as follows:

$$\min E_{dist} = \sum_{k=1}^{M} \sum_{i=2}^{N} \sum_{j=1}^{i-1} (x_{ik} \wedge x_{jk}) m_{i,j} \qquad (4)$$

Further, the objective function is linearized using an additional decision variable $$y_{ijk} = \in \{0, 1\} \text{ for } i, j \in \{1 \ldots N\}, k \in \{1 \ldots M\}; \qquad (5)$$

$$\min E_{dist} = \sum_{k=1}^{M} \sum_{i=2}^{N} \sum_{j=1}^{i-1} y_{ijk} m_{i,j}$$

Furthermore, $$y_{ijk} = (x_{ik} \wedge x_{jk})$$

is computed by including the following constraints in the form $$y_{ijk} \leq x_{ik} \qquad (6)$$

$$y_{ijk} \leq x_{ik} \qquad (7)$$

$$y_{ijk} \geq x_{ik} + x_{jk} - 1 \qquad (8)$$

In addition, it is ensured that each pattern is mapped to exactly one subset $S_k$ by imposing the following:

$$\sum_{k=1}^{M} x_{ik} = 1, i \in \{1 \ldots N\} \qquad (9)$$

As a result, the integer linear program (ILP) formulation requires $O(N^2M)$ binary decision variables and $O(N^2M)$ linear constraints in total.

A second optimization technique is based on poles heuristic. Here, when distributing for M DFAs, the heuristic first selects the set P of patterns, the poles. The first two poles are the patterns i and j with the largest value $m_{i,j}$. It keeps adding patterns i so that $$\underset{i}{\operatorname{argmax}} \sum_{i} \sum_{j \in P} m_{i,j} \qquad (10)$$

until P contains M patterns. M sets $S_k$ are initialized so that each contains one of the poles. The remaining patterns are distributed one of after another by adding patterns i to $S_k$ so that $$\underset{k}{\operatorname{argmin}} \sum_{j \in S_k} m_{i,j} \qquad (11)$$

A multi-pass variation of this scheme can yield slightly improved results: after the initial distribution, it is looped over all patterns i to find k according to above equation (11) for each pattern. If pattern i is currently in set $S_l$ (l≠k), it is removed from $S_l$ and added to $S_k$. This loop is repeated until there are no changes during an entire loop. The poles heuristic is very fast and considers the pair-wise distances $m_{i,j}$.

A further optimization technique is simulated annealing and is shown for example in "S. Kirkpatrick, C. D. Gelatt, and M. P. Vecchi, "Optimization by simulated annealing", Science, vol. 200, pp. 671-680, 1983", referenced as [6].

Figure 5:
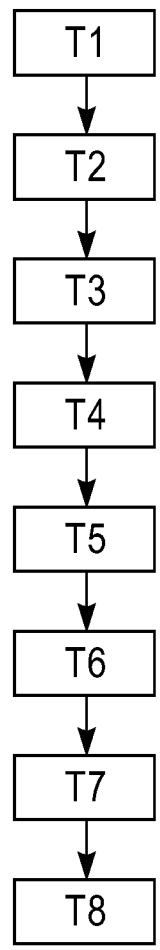
FIG. 5 shows a second embodiment of a sequence of method steps for distributing patterns to scanning engines for scanning packets in a packet stream.

Further, FIG. 5 shows a second embodiment of essential method steps for distributing patterns to scanning engines for scanning patterns in a packet stream. The second embodiment of the method according to FIG. 5 has the following method steps T1 to T8:

Method Step T1:

A number C of constraints is defined. The respective constraint is adapted to constrain the mapping of the N patterns to the M scanning engines.

The constraints may include at least one first mapping condition, the respective first mapping condition requiring that a defined subset of N patterns is to be compiled onto one common scanning engine.

Further, the constraints may include at least one second mapping condition, the respective second mapping condition requiring that a defined subset of the N patterns is to be compiled onto different scanning engines.

Furthermore, the constraints may include at least one third mapping condition, the respective third mapping condition requiring that at least two defined patterns shall have a respective defined distance when compiled onto one common scanning engine.

In addition, the constraints may include at least one fourth mapping condition, the respective fourth mapping condition requiring that at least two defined patterns shall have a respective defined distance when compiled onto different scanning engines.

The constraints may be defined or set by a user.

For example, the user can define groups of the form:
group 0=engines 0, 1, 2, 3
group 1=engines 4, 5, 6, 7

The user can further define constraints of the form:
pattern i and j have to be mapped to the same engine
pattern i and j have to be mapped to different engines
pattern i and j have to be mapped to the same group of engines
pattern i and j have to be mapped to different groups of engines Method Step T2:

A plurality M of scanning engines is provided.

Method Step T3:

A plurality N of patterns is provided, each pattern having a respective definite memory consumption when compiled onto a scanning engine. Preferably, the N patterns are provided in dependence on the C constraints as defined in accordance with method step T1.

Method Step T4:

A respective distance metric is calculated for every pair of patterns, the respective distance metric representing the difference in memory consumption of the two patterns of the pair when compiled between mutual compilation onto a single scanning engine and separate compilation onto two scanning engines.

Method Step T5:

Incompatible patterns within the plurality N of provided patterns are identified.

Preferably, a pattern is identified as an incompatible pattern if it has a respective memory consumption higher than a defined memory consumption threshold when compiled onto one scanning engine solely.

Here, in particular, a powerset algorithm may be used, which is used to generate the DFA representation of the respective pattern. The powerset algorithm generates an NFA in an intermediate step. Then, a ratio q=a(i)/anfa(i) is calculated, where anfa(i) is the memory consumption of the NFA representation of the pattern i and a(i) is the memory consumption of the DFA representation of the pattern i. If q is above a certain user defined threshold, the pattern i is added to the list of incompatible patterns. A typical threshold may be ten.

Furthermore, a pattern may be identified as an incompatible pattern if it results in respective memory consumption higher than a defined memory consumption threshold when compiled onto one scanning engine together with others of the N patterns.

This identifying may include the following substeps:
calculating a sum value for the respective pattern by accumulating all distance metrics of the respective patterns to all other N−1 patterns;
calculating an average means value of the calculated sum values;
calculating a standard deviation value of the calculated sum values;
identifying a respective pattern as an incompatible pattern, if the calculated respective sum value is greater than a sum of the calculated average mean value and the calculated standard deviation value.

Based on the identifying of incompatible patterns, a list of incompatible patterns may be generated. Furthermore, the provided N patterns may be automatically re-configured in dependence on the generated list of incompatible patterns.

The generated list of incompatible patterns may be provided to a user together with configuration means, wherein the user can re-configure the provided N patterns by means of the configuration means and in dependence on the generated list of incompatible patterns.

Method Step T7:

For each of the D distribution functions, a respective sum of the calculated distance metrics is calculated. The respective sum estimates the memory consumption for compiling the N patterns to the M scanning engines by pair-wise accumulating the distance metrics of every pair of patterns being mapped to the same scanning engine in accordance with the respective distribution function. Thus, the respective sum includes only the distance metrics of these pair of patterns that share a common scanning engine according to the respective distribution function.

Method Step T8:

First, the distribution functions of the D distribution functions are extracted that fulfil the C constraints to provide a number E of extracted distribution functions.

Second, the distribution function is selected from the E extracted distribution functions having the minimal calculated sum for distributing N patterns to the M scanning engines.

Figure 6:
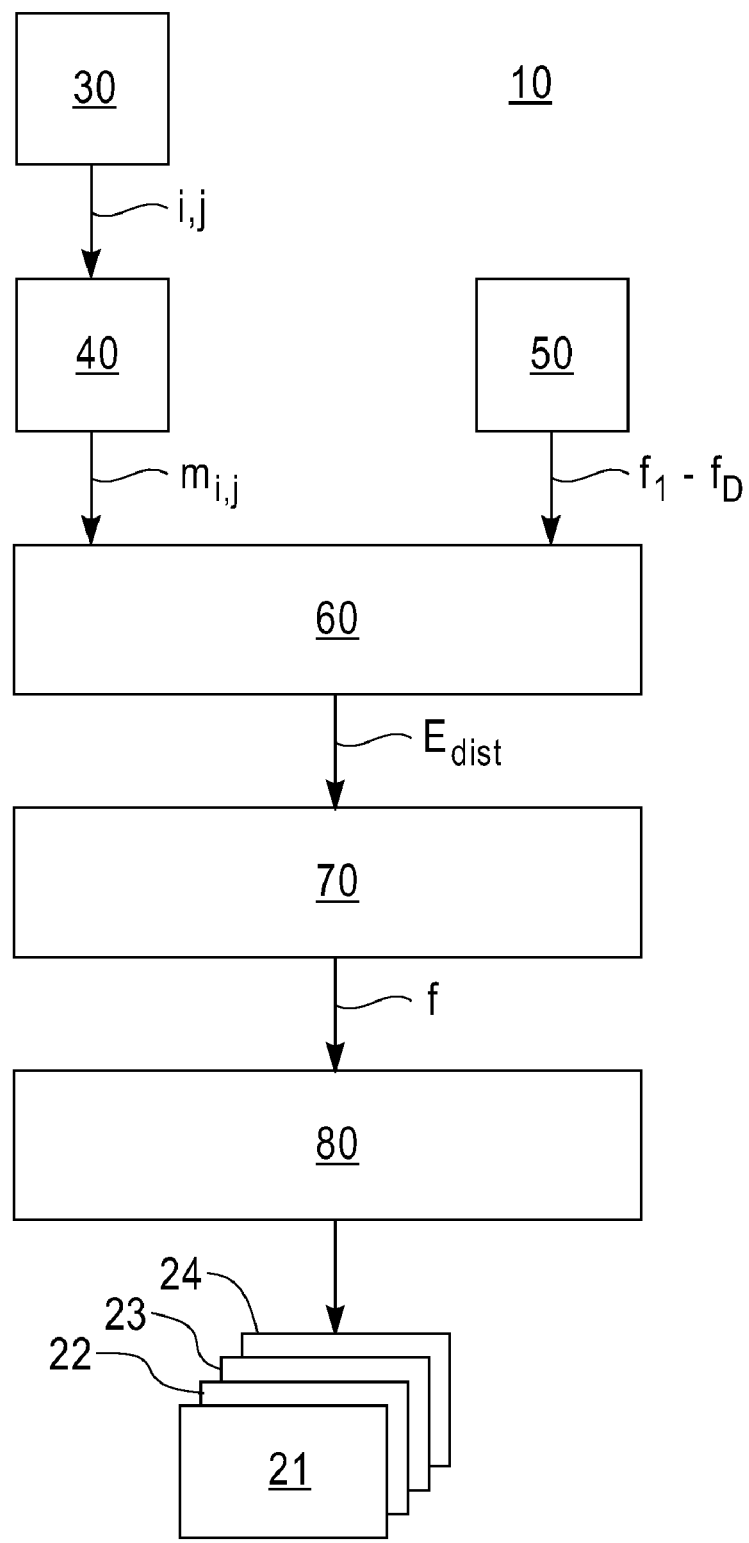
FIG. 6 shows an embodiment of a device for distributing patterns to scanning engines for scanning packets in a packet stream.

FIG. 6 shows an embodiment of a device 10 for distributing patterns i, j to scanning engines 21-24 for scanning packets in a packet stream.

The device 10 includes a plurality M of scanning engines 21-24, first means 30, second means 40, third means 50, fourth means 60, fifth means 70 and a compiler 80.

The first means 30 are adapted to provide a plurality N of patterns i, j, each pattern i, j having a respective definite memory consumption when compiled onto a scanning engine 21-24. Without loss of generality, FIG. 6 shows only the two variables i, j to indicate the N patterns. In a real system, the number N of patterns may be several hundreds to several thousands.

Further, the second means 40 are adapted to calculate a respective distance metric $m_{i,j}$ for every pair of patterns i, j, the respective distance metric $m_{i,j}$ representing the difference in memory consumption of the two patterns i, j of the pair when compiled between mutual compilation onto a single scanning engine 21, for example, and separate compilation onto two scanning engines 21, 22, for example.

Furthermore, the third means 50 are adapted to provide a plurality D of distribution functions $f_1$-$f_D$, the respective distribution function $f_1$-$f_D$ mapping the N patterns i, j to the M scanning engines 21-24.

In addition, the fourth means 60 are adapted to calculate a respective sum of the calculated distance metrics $m_{i,j}$ for distributing the N patterns i, j for each of the D distribution functions $f_1$-$f_D$. The respective sum estimates the memory consumption for compiling the N patterns i, j to the M scanning engines 21-24 by accumulating the distance metrics $m_{i,j}$ for every pair of patterns i, j being mapped to the same scanning engine 21, 22, 23 or 24 for the respective distribution function $f_1$-$f_D$. These sums may be represented by the above energy function $E_{dist}$ of equation (1).

The fifth means 70 are adapted to select the distribution function f of the D distribution functions $f_1$-$f_D$ having the minimal calculated sum for distributing the N patterns i, j to the M scanning engines 21-24.

Figure 7:
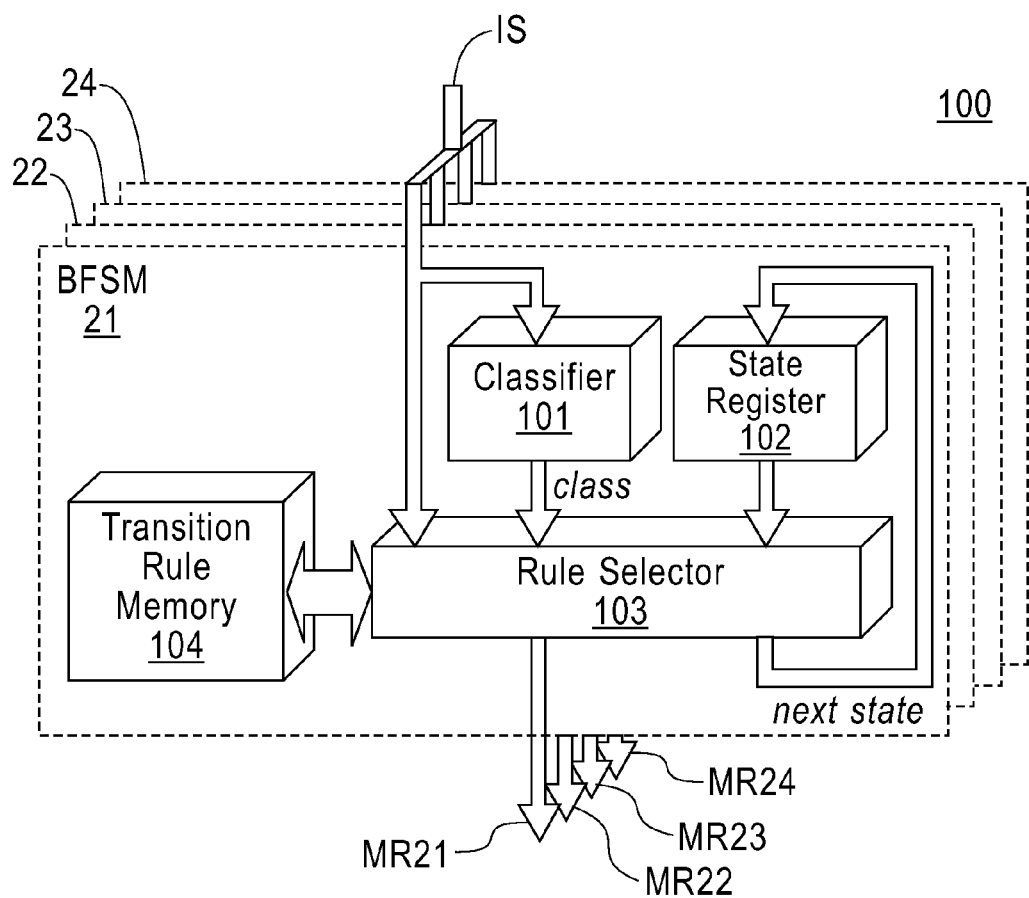
FIG. 7 shows an embodiment of a pattern-scanning engine for scanning packets in a packet stream.

Further, FIG. 7 shows an embodiment of a pattern-scanning engine 100 for scanning packets in a packet stream.

The pattern-scanning engine 100 has a plurality M of scanning engines 21-24 embodied as DFAs. Without loss of generality, M=4 for FIG. 7. The four DFAs 21-24 may be implemented using the BaRT-based Finite State Machine technology (B-FSM) presented in [7].

The respective B-FSM 21-24 has a classifier 101, a state register 102, a rule selector 103 and a transition rule memory 104. The respective B-FSM, such as B-FSM 21, is adapted to receive an input stream IS and to provide a stream of match result MR. In this regard, the first B-FSM 21 outputs the match-result stream MR 21, for example.

Each DFA 21-24 is adapted to be responsible for detecting a disjoint subset of the N patterns in the provided input stream IS. Although a larger number than four of DFAs may provide more freedom for the distribution, the algorithm to optimize the storage efficiency, it will also increase the overall pattern-scanning engine state, as the latter is the combination of all DFA states. The size of the pattern-scanning engine state is important when multiple input streams IS are processed in an interleaved fashion, and has to be stored and retrieved when switching between streams. For this reason, it is preferably focused on implementations with relatively few DFAs, particularly between four and eight, four in the example of FIG. 7.

The respective B-FSM 21-24 embody the respective DFA for a programmable DFA implementation in hardware, in which the "operation" of the DFA may be programmed using a special data structure stored in a memory, such as SRAM or DRAM. The B-FSM data structure may be constructed from so-called transition rules, which may be organized in multiple linked hash tables.

A transition rule provides a flexible definition of a state transition by supporting various input conditions, such as wildcards, case sensitivity, and negated conditions. It also efficiently supports character classes by allowing a transition rule to test either the current input value or the corresponding class information generated by the classifier component, which classifies each input value into typically 16 or 32 so-called programmable base classes. The B-FSM applies a special hash function to select the applicable transition rule for any given state and input combination by evaluating all conditions of all rules in parallel. The hash function enables high processing rates. Synthesis results in 45-nm CMOS technology show that beyond 2 GHz a transition per cycle is possible. This allows scan rates of around 16 to 20 Gbps per input stream. Moreover, the hash function has storage requirements that grow approximately linearly with the number of state transitions, and thus achieves one of the most storage-efficient data structures in the industry, as reported in [7].

The B-FSM data structure may be generated in two steps. First, the so-called pattern compiler performs the grouping of the patterns, followed by the compilation of each pattern group into a separate state-diagram description based on the transition rules mentioned above. This compilation is partially based on the power-set algorithm [8]. In the second step, the B-FSM compiler will map these state-diagram descriptions onto the hash tables that make up the B-FSM data structure.

The utilizing step can include selecting the distribution function of the D distribution functions having the minimal calculated sum for distributing the N patterns to the M scanning engines; and/or pre-selecting a group of distribution functions of the D distribution functions, preferably a group having the lowest calculated sums. Such a group may establish a possible candidate list for a final selection of a distribution function.

The utilizing step can further include selecting one of the distribution functions of the group of pre-selected distribution functions for distributing the N patterns to the M scanning engines. The latter selection may be based on one or more further selection criteria, e.g. the real memory consumption after compilation or the respective cache performance. This establishes a final or second selection step from the pre-selected distribution functions.

Furthermore, the N patterns may be compiled onto the M scanning engines in a way that a total memory requirement for the M scanning engines may be minimized.

This minimization of the total memory requirement has advantageous effects, because the storage or memory efficiency of the compiled patterns is an important factor in the overall performance and depends on the distribution of the patterns across a limited number (here M) of parallel pattern-matching engines or scanning engines.

Because the distribution of N patterns to M scanning engines may be not computationally feasible for a large N, embodiments of the present invention provide heuristic solution techniques.

In one embodiment of the method of the present invention, the method includes a step of identifying incompatible patterns within the plurality N of provided patterns.

In a further embodiment, a pattern is identified as an incompatible pattern if it has respective memory consumption higher than a defined memory consumption threshold when compiled onto one scanning engine solely.

In a further embodiment, a pattern is identified as an incompatible pattern if it results in respective memory consumption higher than a defined memory consumption threshold when compiled onto one scanning engine together with others of the N patterns.

In a further embodiment, the step of identifying a pattern as an incompatible pattern includes:
  calculating a sum value for the respective pattern by accumulating all distance metrics of the respective patterns to all other N−1 patterns;
  calculating an average means value of the calculated sum values;
  calculating a standard deviation value of the calculated sum values; and
  identifying a respective pattern as an incompatible pattern, if the calculated respective sum value is greater than a sum of the calculated average mean value and the calculated standard deviation value.

In a further embodiment, a pre-processing of a pattern for providing a pre-processed pattern is triggered by identifying the pattern as an incompatible pattern.

In a further embodiment, the pre-processing of the pattern includes rewriting the pattern as a semantically equivalent pattern.

In a further embodiment, the pre-processing of the pattern includes rewriting the respective pattern as a plurality of patterns, which together are semantically equivalent to the respective pattern.

In a further embodiment, a list of incompatible patterns is generated from the identified incompatible patterns wherein the provided N patterns are automatically re-configured in dependence on the generated list of incompatible patterns.

In a further embodiment, a list of incompatible patterns is generated from the identified incompatible patterns, wherein the generated list of incompatible patterns and configuration means are provided to a user, wherein the user can re-configure the provided N patterns by means of the configuration means and in dependence on the generated list of incompatible patterns.

In a further embodiment, a number C of constraints may be defined, the respective constraint constraining the mapping of the N patterns to the M scanning engines.

In a further embodiment, the C constraints may include the following constraints:
  at least one first mapping condition, the respective first mapping condition requiring that a defined subset of the N patterns is to be compiled onto one common scanning engine;
  at least one second mapping condition, the respective second mapping condition requiring that a defined subset of the N patterns is to be compiled onto different scanning engines;
  at least one third mapping condition, the respective third mapping condition requiring that at least two defined patters of the N patterns are to be compiled onto one common group of scanning engines; and/or
  at least one fourth mapping condition, the respective fourth mapping condition requiring that at least two defined patterns of the N patterns are to be compiled onto different groups of scanning engines.

In a further embodiment, the method step a) includes providing the N patterns in dependence on the C constraints.

In a further embodiment, the method includes:
  extracting the distribution functions of the D distribution functions that fulfill the C constraints to provide a number E of extracted distribution functions; and
  selecting the distribution function of the E extracted distribution functions having the minimal calculated sum for distributing the N patterns to the M scanning engines.

In a further embodiment, the method includes:
  distributing N patterns to M scanning engines according to the above described method for distributing patterns to scanning engines for scanning packets in a packet stream;
  compiling the distributed N patterns onto to the M scanning engines;
  providing a packet stream; and
  scanning the packets of the provided packet stream by means of the M scanning engines.

In a further embodiment, a packet-scanning engine for scanning packets in a packet stream includes:
  M scanning engines;
  an above described device for distributing patterns to scanning engines; and
  a compiler for compiling the distributed N patterns onto the M scanning engines wherein the M scanning engines are adapted to scan the packets of the provided packet stream according to the distribution of the N patterns, respectively.

All above mentioned embodiments of the method of the present invention may be embodied by respective means to be a respective embodiment of the device for distributing patterns to scanning engines for scanning packets in a packet stream of above mentioned second aspect of the invention.

What has been described herein is merely illustrative of the application of the principles of the present invention. Other arrangements and systems may be implemented by those skilled in the art without departing from the scope and spirit of this invention.

Although the above description has been made of the preferred embodiments, those skilled in the art should appreciate that the above system, device and method may be implemented by using a computer executable instruction and/or by being included in a processor control code. For example, such code is provided on a magnetic diskette, carrier medium of CD or DVD-ROM, a programmable memory such as read-only memory (firmware) or data carrier such as an optical or electronic signal carrier.

The device, the server and units thereof according to the present embodiments may be implemented by a Super-Large Scale Integration or a gate array, a semiconductor such as logic chip and transistor, or hardware circuitry of a programmable hardware device such as field-programmable gate array or a programmable logic device and may also be implemented by combination of the above hardware circuitry and software.

Although the device and method of the present invention have been described in detail with reference to the preferred embodiments, the present invention is not limited hereto. Those skilled in the art can make various alterations, replacements and modifications to the present invention without departing from the spirit and scope of the present invention under the teaching of the present description. It should be understood that all such alternations, replacements and modifications still fall within the scope of protection of the present invention.

The respective means may be implemented in hardware or in software. If the means are implemented in hardware, it may be embodied as a device, such as, a computer, or as a processor, or as a part of a system such as a computer-system. If the means are implemented in software, it may be embodied as a computer program product, as a function, as a routine, as a program code or as an executable object.

REFERENCE SIGN LIST $E_{dist}$ energy function
f selected distribution function
$f_1$-$f_D$ distribution function
i, j pattern
$m_{i,j}$ distance metric between the patterns i and j
10 device for distributing patterns
21-24 scanning engines
30 first means
40 second means
50 third means
60 fourth means
70 fifth means
80 compiler
100 pattern-scanning engine
101 classifier
102 state register
103 rule selector
104 transition rule memory

We claim:

1. A computer implemented method for distributing patterns to scanning engines for scanning packets in a packet stream, the method comprising:
    providing a plurality of scanning engines;
    providing a plurality of patterns, each pattern having a respective definite memory consumption when compiled onto a scanning engine;
    calculating a respective distance metric for every pair of patterns, wherein the respective distance metric represents the difference in memory consumption of the two patterns of the pair when compiled between mutual compilation onto a single scanning engine and separate compilation onto two scanning engines;
    providing a plurality of distribution functions, the respective distribution function mapping the patterns to the scanning engines;
    calculating, for each of the distribution functions, a respective sum of the calculated distance metrics for distributing the patterns, the respective sum estimating the memory consumption for compiling the patterns to the scanning engines by accumulating the distance metrics of every pair of patterns being mapped to the same scanning engine for the respective distribution function;
    utilizing the sums for selecting a distribution function of the distribution functions for distributing the patterns to the scanning engines;
        extracting the distribution functions of the distribution functions that fulfil the constraints to provide a number of extracted distribution functions; and
    selecting the distribution function of the extracted distribution functions having the minimal calculated sum for distributing the patterns to the scanning engines;
    wherein the steps of the method are carried out using a computer device; and
    wherein a pattern is identified as an incompatible pattern in response to the pattern resulting in a respective memory consumption higher than a defined memory consumption threshold when compiled onto one scanning engine together with others of the patterns.

2. The method of claim 1, further comprising the step of identifying incompatible patterns within the plurality of provided patterns.

3. The method of claim 2, wherein a pattern is identified as an incompatible pattern if it has a respective memory consumption higher than a defined memory consumption threshold when compiled onto one scanning engine.

4. The method of claim 3, wherein identifying a pattern as an incompatible pattern comprises:
    calculating a sum value for the respective pattern by accumulating all distance metrics of the respective patterns to all other patterns;
    calculating an average means value of the calculated sum values;
    calculating a standard deviation value of the calculated sum values; and
    identifying a respective pattern as an incompatible pattern in response to the calculated respective sum value being greater than a sum of the calculated average mean value and the calculated standard deviation value.

5. The method of claim 2, wherein a pre-processing of a pattern for providing a pre-processed pattern is triggered by identifying the pattern as an incompatible pattern.

6. The method of claim 5, wherein the pre-processing of the pattern includes rewriting the respective pattern as a semantically equivalent pattern.

7. The method of claim 6, wherein the pre-processing of the respective pattern includes rewriting the respective pattern as a plurality of patterns, which together are semantically equivalent to the respective pattern.

8. The method of claim 2, wherein a list of incompatible patterns is generated from the identified incompatible patterns wherein the provided patterns are automatically reconfigured in dependence on the generated list of incompatible patterns.

9. The method of claim 2, wherein:
    a list of incompatible patterns is generated from the identified incompatible patterns;
    the generated list of incompatible patterns and configuration means are provided to a user; and
    the user can re-configure the provided patterns by means of the configuration means and in dependence on the generated list of incompatible patterns.

10. The method of claim 1, wherein a number of constraints and the respective constraint constraining the mapping of the patterns to the scanning engines are defined.

11. The method of claim 10, wherein the constraints comprise:

at least one first mapping condition, wherein the respective first mapping condition requires that a defined subset of the patterns is to be compiled onto one common scanning engine;

at least one second mapping condition, wherein the respective second mapping condition requires that a defined subset of the patterns is to be compiled onto different scanning engines; and at least one third mapping condition, wherein the respective third mapping condition requires that at least two defined patterns of the patterns are to be compiled onto different groups of scanning engines.

12. The method of claim 10, wherein the constraints comprise:

at least one first mapping condition, wherein the respective first mapping condition requires that a defined subset of the patterns is to be compiled onto one common scanning engine;

at least one second mapping condition, wherein the respective second mapping condition requires that a defined subset of the patterns is to be compiled onto different scanning engines; and at least one third mapping condition, wherein the respective third mapping condition requires that at least two defined patters of the patterns are to be compiled onto one common group of scanning engines.

13. The method of claim 10, wherein the constraints comprise:

at least one first mapping condition, wherein the respective first mapping condition requires that a defined subset of the patterns is to be compiled onto one common scanning engine;

at least one second mapping condition, wherein the respective second mapping condition requires that a defined subset of the patterns is to be compiled onto different scanning engines;

at least one third mapping condition, wherein the respective third mapping condition requires that at least two defined patters of the patterns are to be compiled onto one common group of scanning engines; and at least one fourth mapping condition, the respective fourth mapping condition requiring that at least two defined patterns of the patterns are to be compiled onto different groups of scanning engines.

14. The method of claim 10, wherein the patterns are provided in dependence on the constraints.

15. A device for distributing patterns to scanning engines for scanning packets in a packet stream, the device comprising:

a plurality of scanning engines;

means for providing a plurality of patterns, wherein each pattern has a respective definite memory consumption when compiled onto a scanning engine;

means for calculating a respective distance metric for every pair of patterns, wherein the respective distance metric represents the difference in memory consumption of the two patterns of the pair when compiled between mutual compilation onto a single scanning engine and separate compilation onto two scanning engines;

means for providing a plurality of distribution functions, wherein the respective distribution function maps the patterns to the scanning engines;

means for calculating a respective sum of the calculated distance metrics for distributing the patterns for each of the distribution functions, wherein the respective sum estimates the memory consumption for compiling the patterns to the scanning engines by accumulating the distance metrics of every pair of patterns being mapped to the same scanning engine for the respective distribution function; and means for utilizing the sums for selecting a distribution function of the distribution functions for distributing the patterns to the scanning engines, in particular for selecting the distribution function of the distribution functions having the minimal calculated sum for distributing the patterns to the scanning engines;

wherein the distribution functions that fulfil the constraints are extracted to provide a number of extracted distribution functions;

wherein the distribution function of the extracted distribution functions having the minimal calculated sum are selected for distributing the patterns to the scanning engines; and wherein a pattern is identified as an incompatible pattern in response to the pattern resulting in a respective memory consumption higher than a defined memory consumption threshold when compiled onto one scanning engine together with others of the patterns.

* * * * *